(12) United States Patent
Salazar Calderón (10) Patent No.: US 11,865,879 B2
(45) Date of Patent: Jan. 9, 2024

(54) VEHICLE BODY STRUCTURE

(71) Applicant: Nissan North America, Inc., Franklin, TN (US)

(72) Inventor: Paola Corina Salazar Calderón, Lerma (CA)

(73) Assignee: Nissan North America, Inc., Franklin, TN (US)

( * ) Notice: Subject to any disclaimer, the term of this patent is extended or adjusted under 35 U.S.C. 154(b) by 404 days.

(21) Appl. No.: 17/152,608

(22) Filed: Jan. 19, 2021

(65) Prior Publication Data

US 2022/0227189 A1    Jul. 21, 2022

(51) Int. Cl.
| | |
|---|---|
| *B60D 1/04* | (2006.01) |
| *B60D 1/60* | (2006.01) |
| *B60D 1/48* | (2006.01) |
| *B60R 19/02* | (2006.01) |

(52) U.S. Cl.
CPC .............. *B60D 1/04* (2013.01); *B60D 1/488* (2013.01); *B60D 1/60* (2013.01); *B60R 19/023* (2013.01)

(58) Field of Classification Search
CPC . B60D 1/04; B60D 1/488; B60D 1/60; B60D 1/565; B60D 1/01; B60D 1/143; B60D 1/243; B60D 1/54; B60D 1/56; B60D 1/58; B60D 1/605; B60R 19/023; B60R 19/48
See application file for complete search history.

(56) References Cited

U.S. PATENT DOCUMENTS

2011/0088228 A1 * 4/2011 Mineshima ........... B60R 19/023
                                                         24/682.1
2020/0070602 A1    3/2020 Greggs

FOREIGN PATENT DOCUMENTS

| DE | 102017004707 A1 * | 11/2018 | |
|---|---|---|---|
| EP | 1112870 A1 * | 7/2001 | ............... B60D 1/60 |
| KR | 19980055052 U | 10/1998 | |
| KR | 19990010974 U | 3/1999 | |

OTHER PUBLICATIONS

Advanced Auto Parts, Dorman Tow Hook 47833, Dec. 8, 2018. (Year: 2018).*
2020 Ford Ranger.
2015 Cheverolet Colorado.

* cited by examiner

*Primary Examiner* — Jacob D Knutson
*Assistant Examiner* — Abigail R Hymel
(74) *Attorney, Agent, or Firm* — Global IP Counselors, LLP (57) ABSTRACT

A vehicle body structure includes a front side member, a tow hook, a bumper assembly and a tow hook cover. The tow hook has an attachment end and a hook end. The attachment end is fixedly attached to the front side member and the attachment end extending away from the hook end. The bumper assembly is connected to the front side member and has at least one fascia panel. The tow hook cover is removably attached to the at least one fascia panel. The tow hook cover has an upright wall portion that defines an opening. At least a portion of the hook end of the tow hook extends through the opening such that the attachment end of the tow hook is at least partially concealed by the tow hook cover.

14 Claims, 9 Drawing Sheets

VEHICLE BODY STRUCTURE

BACKGROUND

Field of the Invention

The present invention generally relates to vehicle body structure that includes a tow hook cover. More specifically, the present invention relates to a vehicle body structure that includes a tow hook cover that is removably installed to a bumper fascia assembly of a vehicle.

Background Information

Pickup trucks, large sports utility vehicles and commercial vehicles often include tow hooks at a front end thereof. The tow hooks are typically rigidly fixed to a structural element of the vehicle, such as a frame element, and extend in a forward direction therefrom. Tow hooks generally have an industrial look as they are typically made of a high strength metal material.

SUMMARY

One object of the present disclosure is to provide a bumper fascia assembly with a tow hook cover in order to improve the appearance of a vehicle.

Another object is to provide a removable tow hook cover that serves as a shield that protects a tow hook of a vehicle when not in use.

In view of the state of the known technology, one aspect of the present disclosure is to provide a vehicle body structure with a front side member, a tow hook, a bumper assembly and a tow hook cover. The tow hook has an attachment end and a hook end. The attachment end is fixedly attached to the front side member and the attachment end extending away from the hook end. The bumper assembly is connected to the front side member and has at least one fascia panel. The tow hook cover is removably attached to the at least one fascia panel. The tow hook cover has an upright wall portion that defines an opening. At least a portion of the hook end of the tow hook extends through the opening such that the attachment end of the tow hook is at least partially concealed by the tow hook cover.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
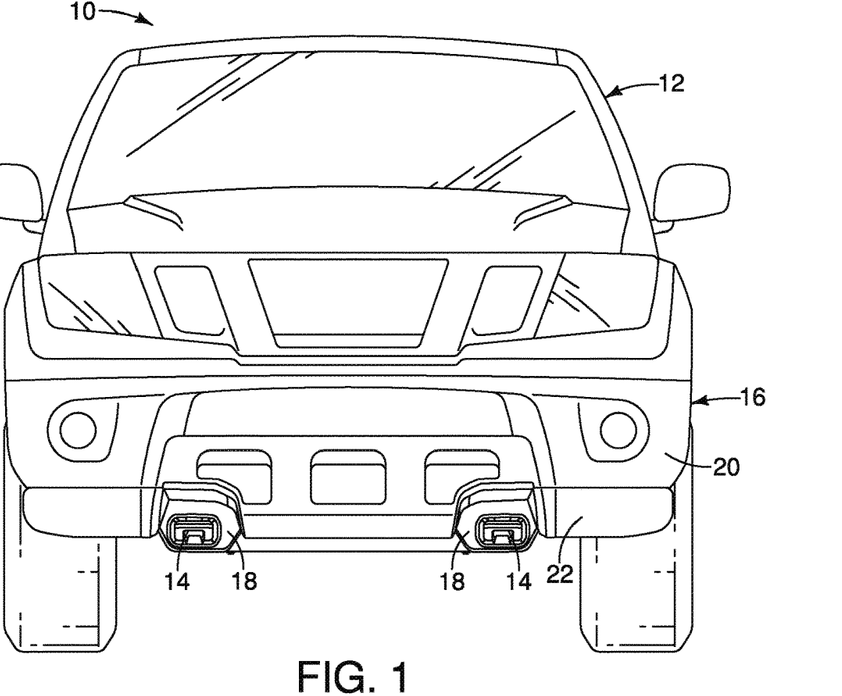
FIG. 1 is a front view of a vehicle that includes tow hooks and a bumper fascia assembly that includes an upper fascia member, a lower fascia member and a pair of tow hook covers installed to the bumper fascia assembly such that a portion of each of the tow hooks extends through a corresponding one of the tow hook covers in accordance with an exemplary embodiment.
Figure 2:
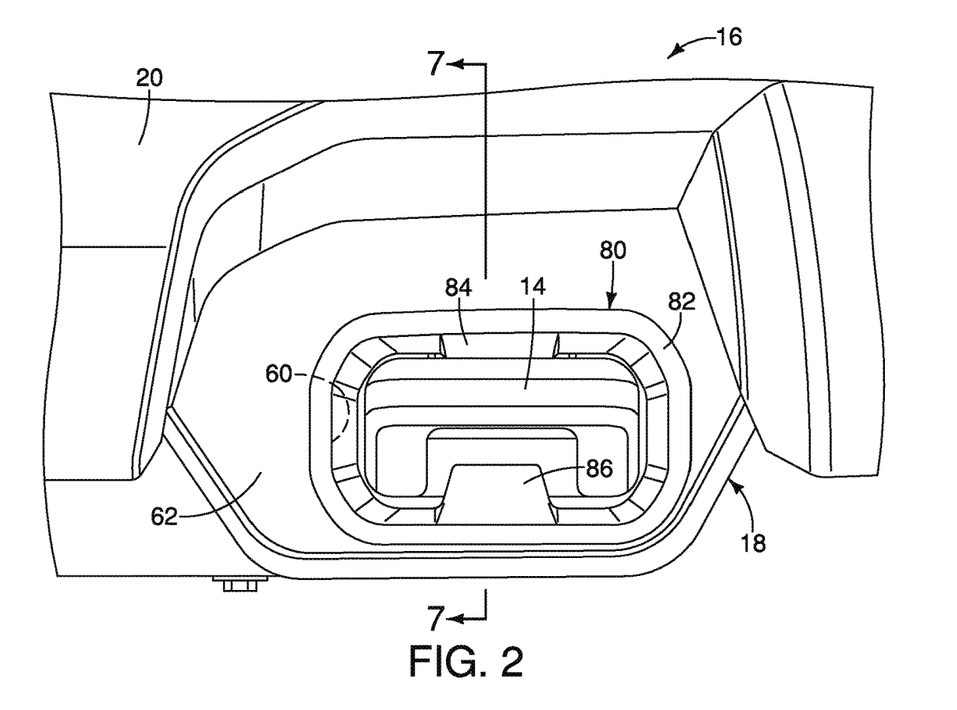
FIG. 2 is a front view of a portion of the bumper fascia assembly showing one of the tow hook covers and the portion of the tow hook that extends through the one of the tow hook covers in accordance with the exemplary embodiment.

Referring initially to FIG. 1, a vehicle 10 having a vehicle body structure 12 is illustrated in accordance with a first embodiment. The vehicle 10 can be any of a variety of vehicle designs, including an SUV (sports utility vehicle), off-road vehicle, and/or a pickup truck.

The vehicle body structure 12 of the vehicle 10 includes various structural elements. For example, as shown in FIG. 1-4, the vehicle body structure 12 includes tow hooks 14 and a front bumper fascia assembly 16 having tow hook covers 18. The tow hooks 14 and the front bumper fascia assembly 16 are attached to the vehicle body structure 12 in a conventional manner. The front bumper fascia assembly 16 is part of a bumper assembly that includes at least a support member (not shown) and an energy absorbing member (not shown). The front bumper fascia assembly 16 covers and conceals the support member and the energy absorbing member of the front bumper assembly. Since support members and energy absorbing members of front bumper assemblies are convention structures, further description is omitted for the sake of brevity.

Figure 3:
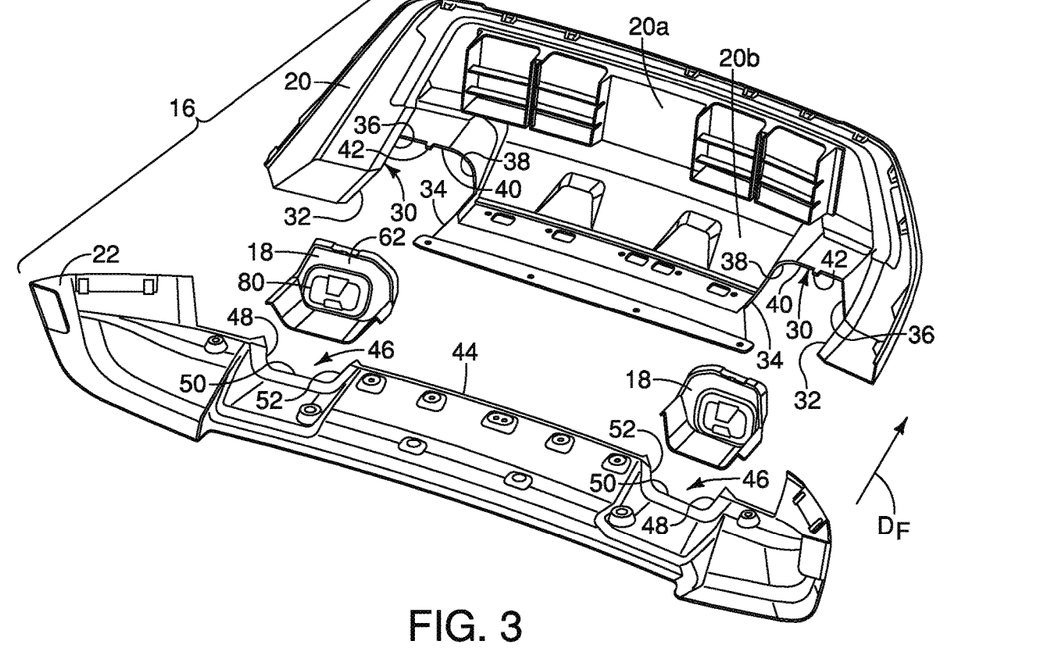
FIG. 3 is an exploded perspective view of the bumper fascia assembly removed from the vehicle showing a rearward or concealed side of the upper fascia member, the lower fascia member and the pair of tow hook covers in accordance with the exemplary embodiment.
Figure 4:
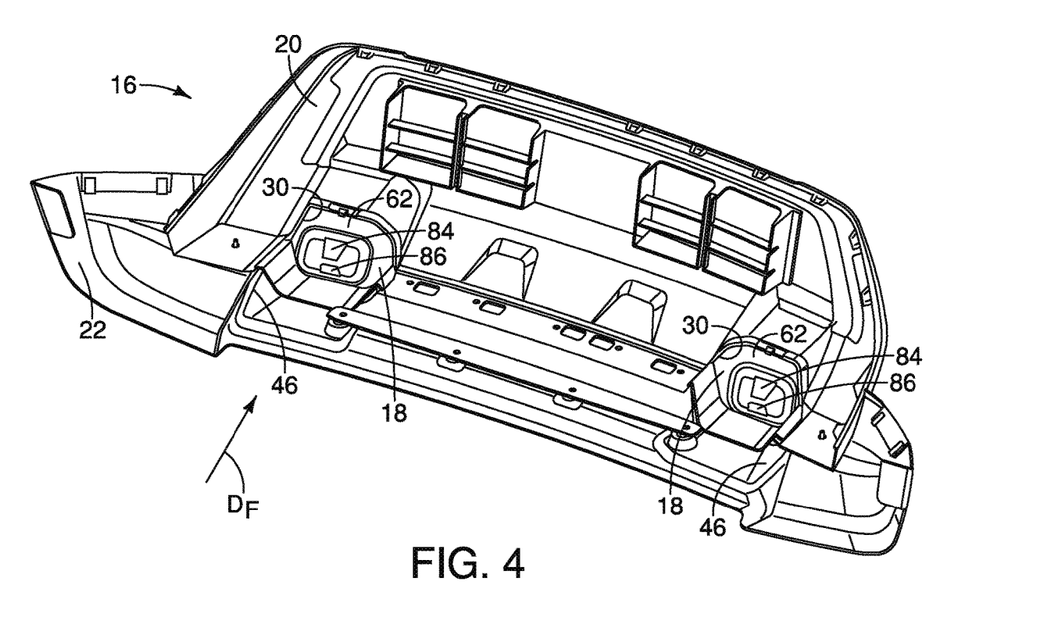
FIG. 4 is a perspective view similar to FIG. 3 of the bumper fascia assembly removed from the vehicle showing the rearward or concealed side of the upper fascia member, the lower fascia member and the pair of tow hook covers fully assembled in accordance with the exemplary embodiment.
Figure 5:
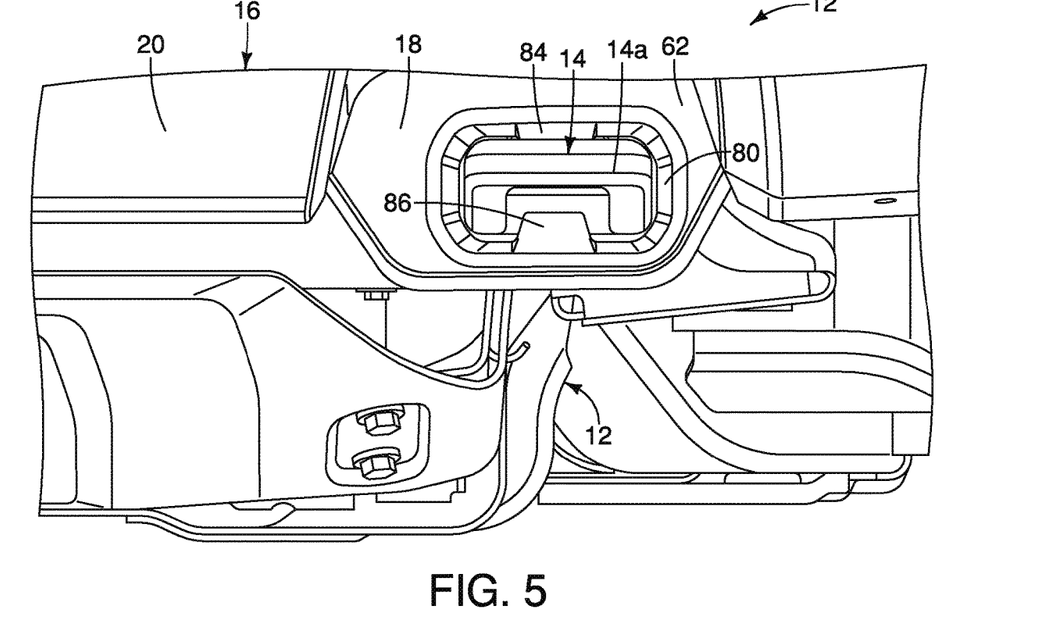
FIG. 5 is a front view of a lower portion of the vehicle with the lower fascia member removed showing the upper fascia member, one of the tow hooks, one of the tow hook covers and various elements of a vehicle body structure of the vehicle in accordance with the exemplary embodiment.

As shown removed from the vehicle 10 and the vehicle body structure 12 in FIGS. 3 and 4, the front bumper fascia assembly 16 includes an upper fascia member 20, a lower fascia member 22 and the pair of tow hook covers 18. FIGS. 3 and 4 show rearward (hidden) surfaces of the upper fascia member 20 and the lower fascia member 22 looking in a forward direction $D_F$.

The tow hook covers 18 are described in greater detail below, following a description of the tow hooks 14 and the other elements of the front bumper fascia assembly 16.

As shown in FIG. 1, there are two tow hooks 14, one on each side of the vehicle. Each tow hook 14 extends through an opening in the front bumper fascia assembly 16, and as described further below, through an opening in a corresponding one of the tow hook covers 18. The tow hooks 14 are included in vehicles such as pickup trucks, sports utility vehicles and commercial vehicles. In the depicted embodiment, the vehicle 10 is a pickup truck shown only from a front end thereof.

The tow hooks 14 are basically identical (except that they may have overall shapes and contours that are mirror images of one another). Therefore, description of only one tow hook 14 is provided herein below and applies equally to both tow hooks 14.

As shown in FIGS. 5-8 and 15, the tow hook 14 is a member that is made of a strong, rigid metal such as steel or alloy. The tow hook 14 (both tow hooks 14) is provided on the vehicle 10 in order to tow or drag heavy objects for short distances via, for example, a chain can be hooked to the end of the tow hook 14. Specifically, the tow hook 14 is conveniently located to tow or drag large objects such as other vehicles, logs, rocks, lumber or other large and/or heavy objects for a short distance without a trailer. Further, the tow hook 14 can also be used to secure the vehicle 10 to a trailer or flat-bed tow truck.

Figure 6:
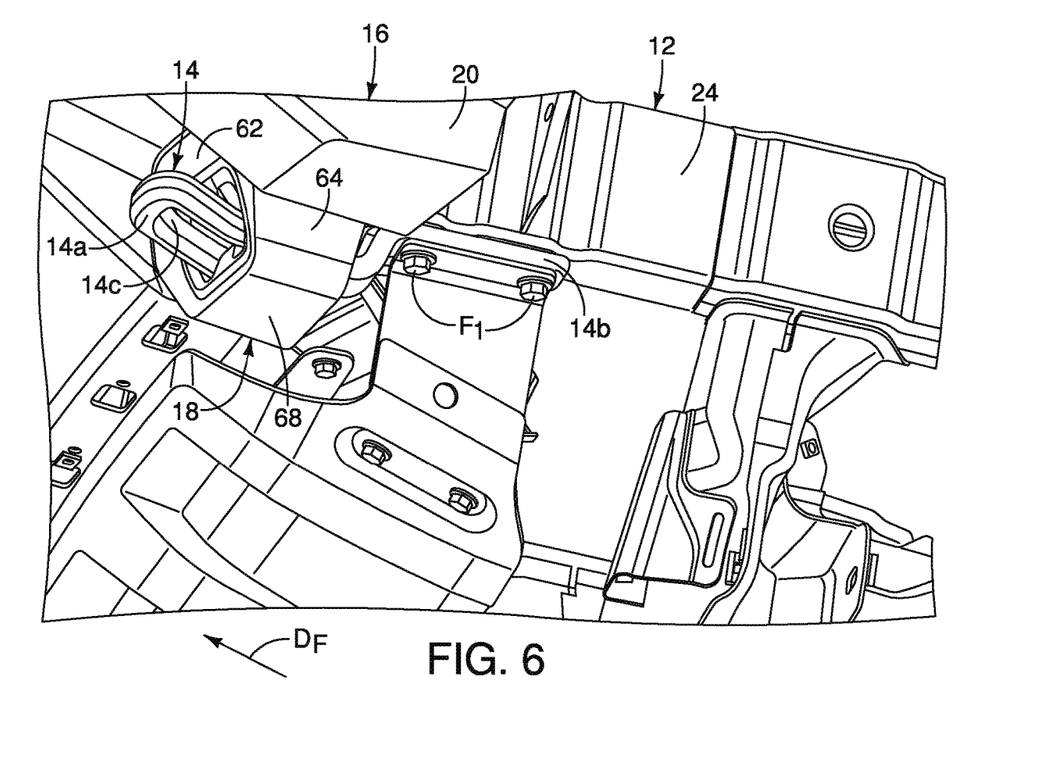
FIG. 6 is a perspective view of the lower portion of the vehicle with the lower fascia member removed showing the upper fascia member, one of the tow hooks, one of the tow hook covers and various elements of the vehicle body structure of the vehicle in accordance with the exemplary embodiment.
Figure 7:
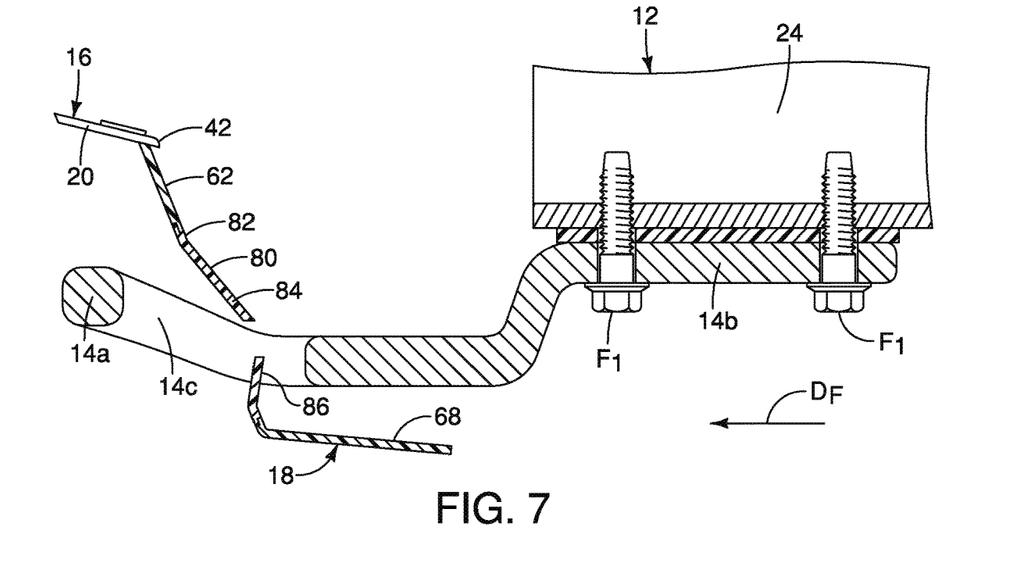
FIG. 7 is a cross-sectional view of a portion of the vehicle body structure taken along the line 7-7 in FIG. 2, showing features of the tow hook and a portion of the tow hook cover in accordance with the exemplary embodiment.
Figure 8:
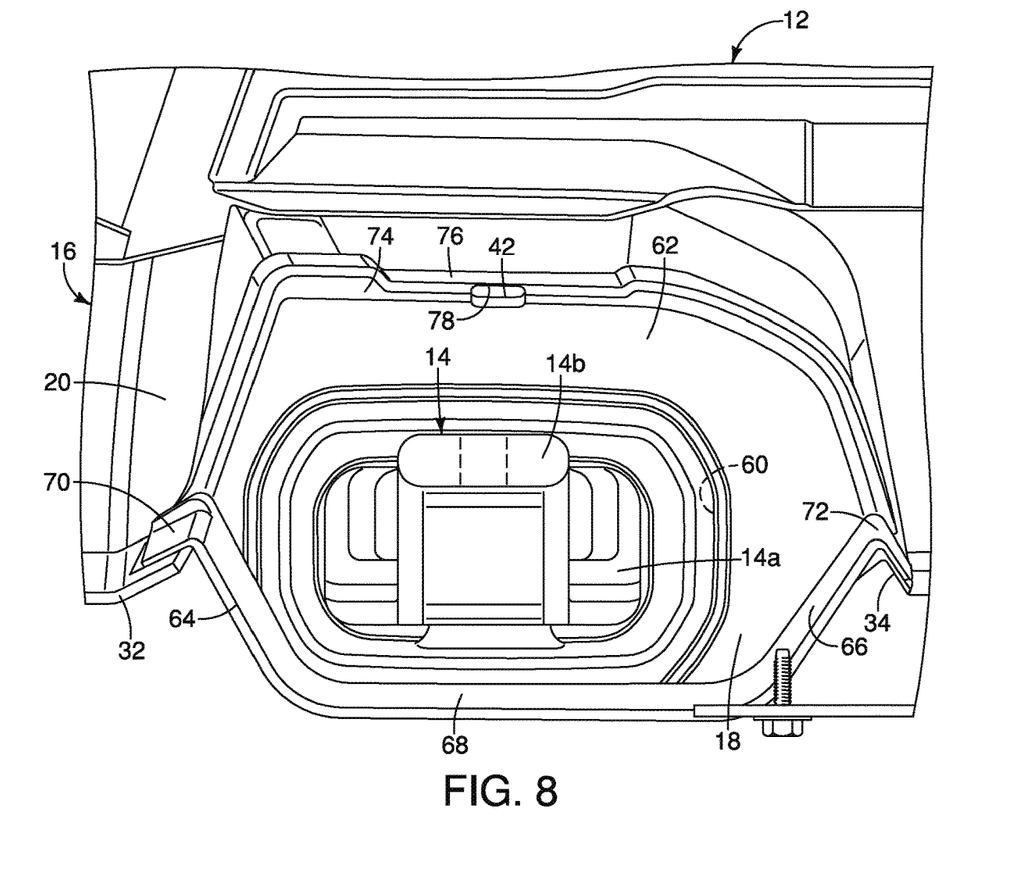
FIG. 8 is a rear view of the lower portion of the vehicle with various elements of the vehicle body structure of the vehicle removed showing the upper fascia member, one of the tow hooks, one of the tow hook covers and in accordance with the exemplary embodiment.
Figure 15:
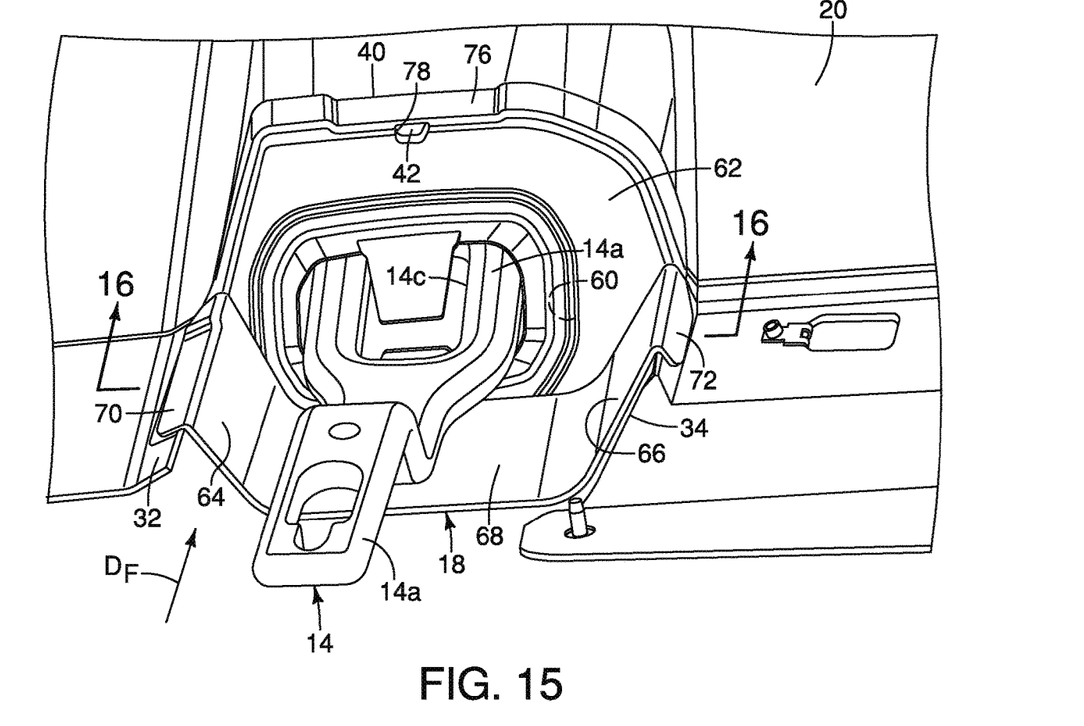
FIG. 15 is another rear perspective view of the portion of the bumper fascia assembly removed from the vehicle showing the tow hook cover installed within the opening defined by the recessed area of the upper fascia member and the recessed area of the lower fascia member with the tow hook shown in position extending through an opening in the tow hook cover in accordance with the exemplary embodiment.
Figure 16:
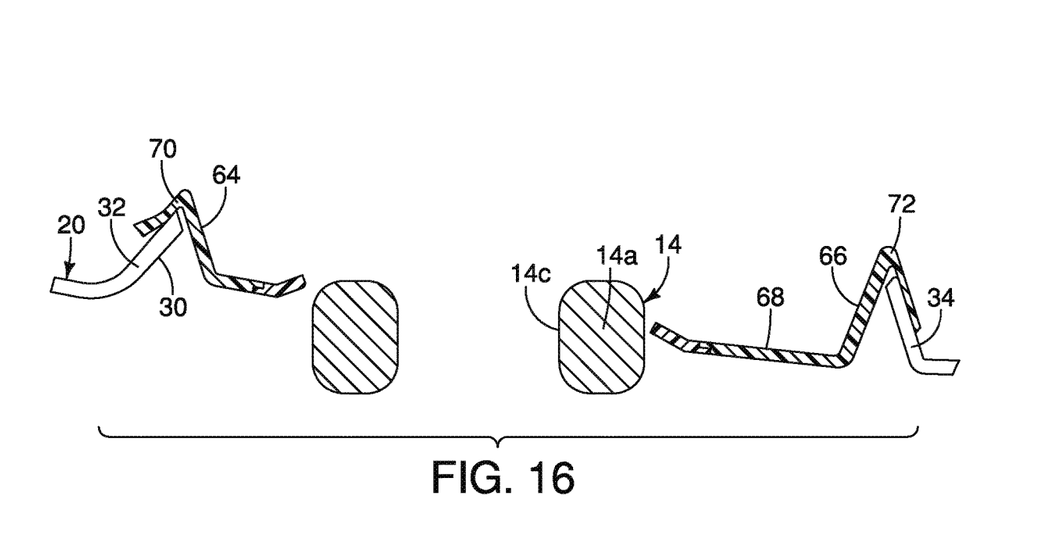
FIG. 16 is a cross-sectional view of a portion of the bumper fascia assembly and the tow hook taken along the line 16-16 in FIG. 15, showing relationship between the tow hook and the tow hook cover in accordance with the exemplary embodiment.
Figure 17:
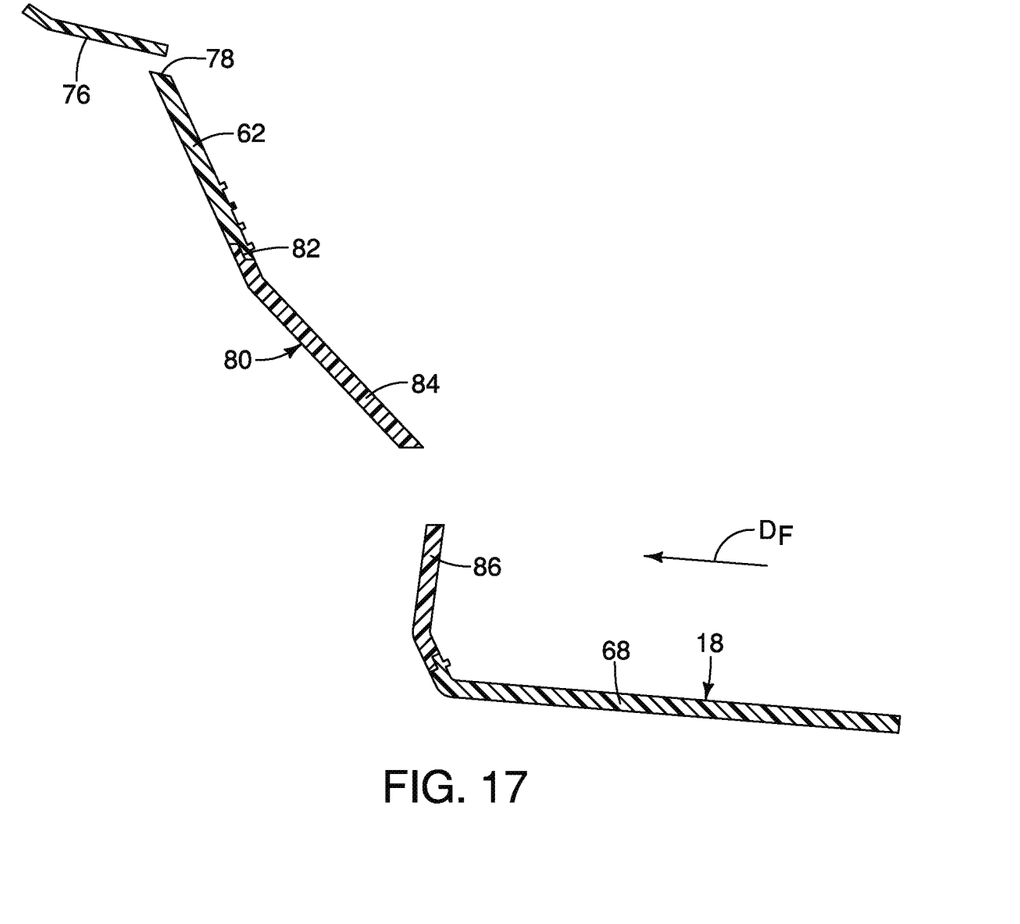
FIG. 17 is a cross-sectional view of the tow hook cover taken along the line 17-17 in FIG. 12, showing features of the tow hook cover in accordance with the exemplary embodiment.

The tow hook 14 has a hook end 14a and an attachment end 14b. As shown in FIGS. 6-7 and 15, the hook end 14a has a large opening 14c that is sufficiently large so as to hook a chain onto the tow hook 14 or tie a large rope thereto. As shown in FIGS. 6 and 7, the attachment end 14b includes two fastener openings with heavy duty fasteners $F_1$ extending therethrough. The fasteners $F_1$ secure the tow hook 14 to a front side member 24 of the vehicle body structure 12.

A description of the front bumper fascia assembly 16 is now provided with specific reference to FIGS. 3-4 and 8-10. FIGS. 3 and 4 show a concealed or rearward facing surface of the upper fascia member 20. The upper fascia member 20 includes many contoured surface portions. The upper fascia member 20 includes an upper section 20a that can include various openings that, for example, provide air flow into an engine compartment, and a lower section 20b that curves rearward under a forward portion of the engine compartment. Along the lower portion 20b, the upper fascia member 20 includes a pair of recessed area 30. The recessed areas 30 identical to one another, except that they are symmetrically shaped as mirror images of one another. Therefore, for the sake of brevity, only one recessed area 30 is described herein below.

As shown in FIGS. 3-4 and 8-10, the recessed area 30 is shaped and dimensioned to receive and retain the tow hook cover 18. Specifically, the recessed area 30 includes a first flange 32, a second flange 34, a first edge 36, a second edge 38 and an upper edge 40. The first flange 32 is an outboard flange relative to a center of the vehicle 10. The second flange 34 is an inboard flange relative to a center of the vehicle 10. The first edge 36 extends upwardly from the first flange 32. The second edge 38 extends upwardly from the second flange 34 but is slightly inclined. The upper edge 40 extends from upper end of the first edge 36 to the upper end of the second edge 38.

The first flange 32 and the second flange 34 are generally horizontally oriented, but can have a slight inclination of between 1 and 15 degrees relative to horizontal such that forward ends thereof are higher than rearward ends thereof. The upper edge 40 includes a snap-fitting projection 42 that is positioned and dimensioned to engage the tow hook cover 18, retaining it in place once installed in a manner described in greater detail below.

Overall, the recessed area 30 can include a variety of overall shapes and sized edges and flanges that confirm to the overall shape of the tow hook cover 18, as described further below.

As shown in FIGS. 3 and 4, the lower fascia member 22 includes a forward edge 44 that includes recessed areas 46 that align with the recessed areas 30 of the upper fascia member 20 when assembled together. The lower fascia member 22 has a forward end that is inclined upward in the vehicle forward direction DF. The rearward portions of the lower fascia member 22 can be approximately horizontal and extend rearward beneath the engine compartment of the vehicle 10. Therefore, rearward portions of the lower fascia member 22 not likely visible from the front of the vehicle 10, as shown in FIG. 1. Since the recessed areas 46 are identical to one another (except that they can have contours and shapes that are mirror images of one another), description of only one recessed area 46 is provided hereinbelow.

The recessed area 46 has an overall U-shape, as shown in FIG. 3, with a first edge 48, a lower edge 50 and a second edge 52. The first edge 48 is an outboard edge and the second edge 52 is an inboard edge with the lower edge extending therebetween.

Figure 9:
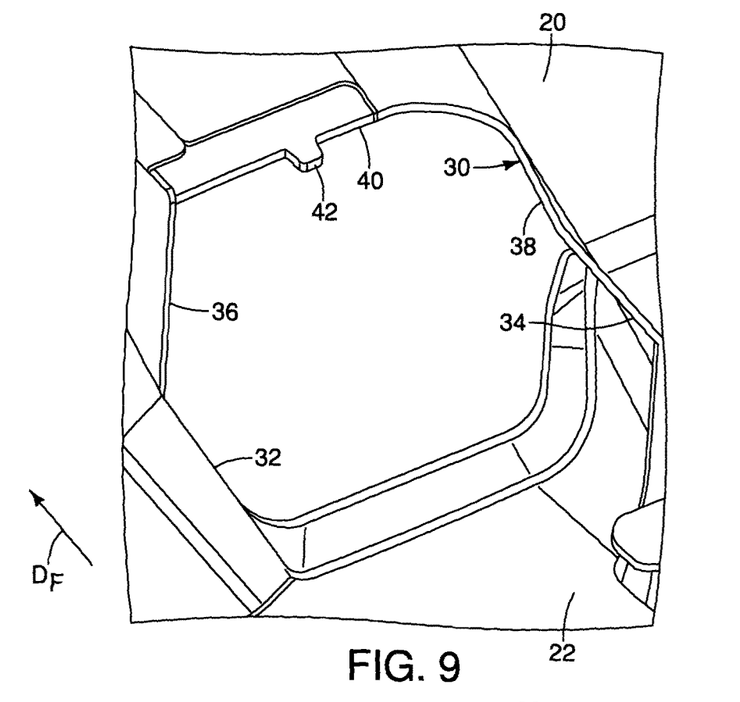
FIG. 9 is a rear perspective view of a portion of the bumper fascia assembly removed from the vehicle showing an opening defined by a recessed area of the upper fascia member and a recessed area of the lower fascia member in accordance with the exemplary embodiment.

As shown in FIGS. 4 and 9 with the lower fascia member 22 and the upper fascia member 20 attached to one another, the recessed area 30 of the upper fascia member 20 and the recessed area 46 of the lower fascia member 46 together define an opening that receives the tow hook cover 18.

Further, the tow hook 14 also extends through the opening defined by the recessed area 30 and the recessed area 46, with the front bumper fascia assembly 16 installed to the vehicle 10.

A description of the tow hook cover 18 is now provided with specific reference to FIGS. 3 and 7-17. The tow hook cover 18 is basically a cup shaped member with an opening 60, with the tow hook 14 extending through the opening 60.

The tow hook cover 18 basically includes an upright wall portion 62, a first side wall 64, a second side wall 66 and a bottom wall 68. The first side wall 64, the second side wall 66 and the bottom wall 68 are all joined or formed together with the bottom wall 68 extending between lower ends of the first and second side walls 64 and 66. The upright wall 62 is joined or formed with the first side wall 64, the second side wall 66 and the bottom wall 68, with the upright wall 62 being joined with forward edges of the first side wall 64, the second side wall 66 and the bottom wall 68. Further, the opening 60 is defined in the upright wall 62.

As shown in FIGS. 8, 10-12, 14 and 16-17, the first side wall 64 has a hook shaped edge 70 and the second side wall 66 has a hook shaped edge 72. More specifically, the hook shaped edges 70 and 72 are elongated edges that fit over the first flange 32 and second flange 34 of the recessed area 30 of the upper fascia member 20.

In other words, the hook shaped edge 70 of the first side wall 64 of the tow hook cover hangs from the first flange 32 of the upper fascia member 20 and the hook shaped edge 72 of the second side wall 66 hangs from the second flange 34 of the upper fascia member 20.

An upper end 74 of the upright wall portion 62 includes a flange 76 that is dimensioned and shaped to overlay a portion of the upper fascia member 20 (the at least one fascia panel). The flange 76 defines a slot 78. The slot 78 is located and dimensioned to receive and retain the snap-fitting projection 42 with the tow hook cover installed to the upper fascia member 20.

Figure 10:
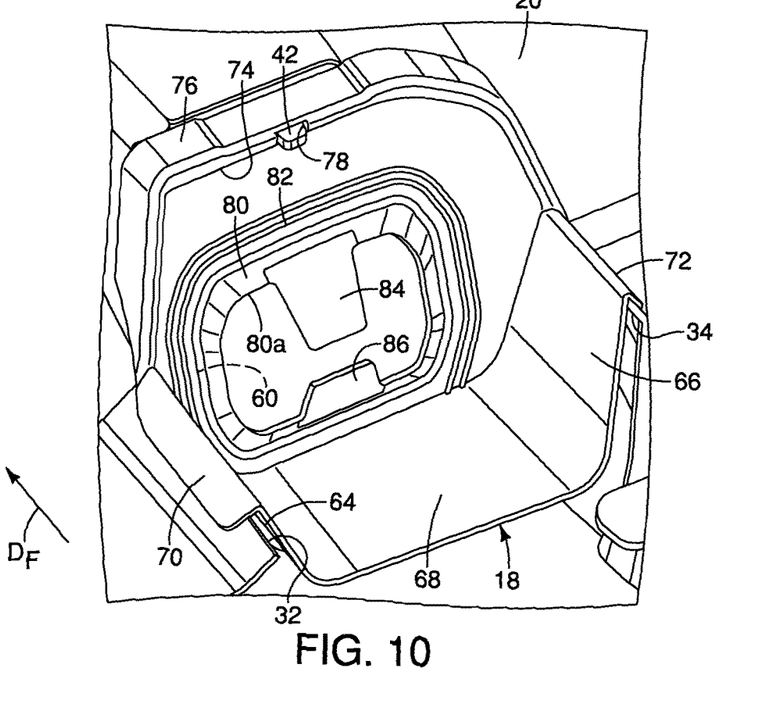
FIG. 10 is another rear perspective view of the portion of the bumper fascia assembly removed from the vehicle showing an opening defined by the recessed area of the upper fascia member and the recessed area of the lower fascia member with one of the tow hook covers installed within the opening in accordance with the exemplary embodiment.
Figure 11:
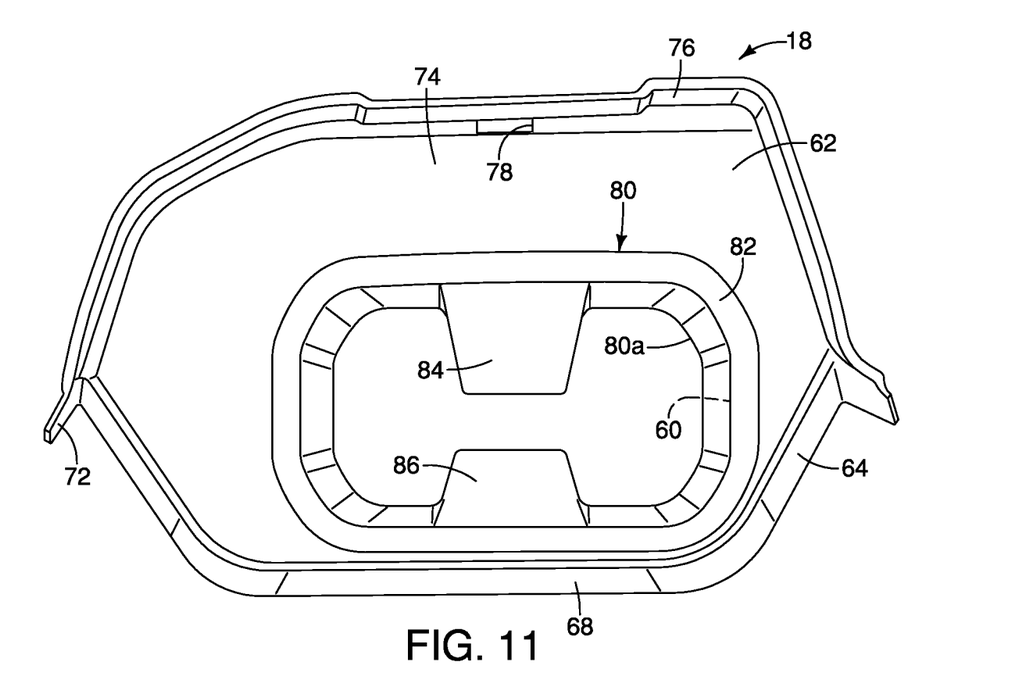
FIG. 11 is a front view of the tow hook cover removed from the vehicle in accordance with the exemplary embodiment.
Figure 12:
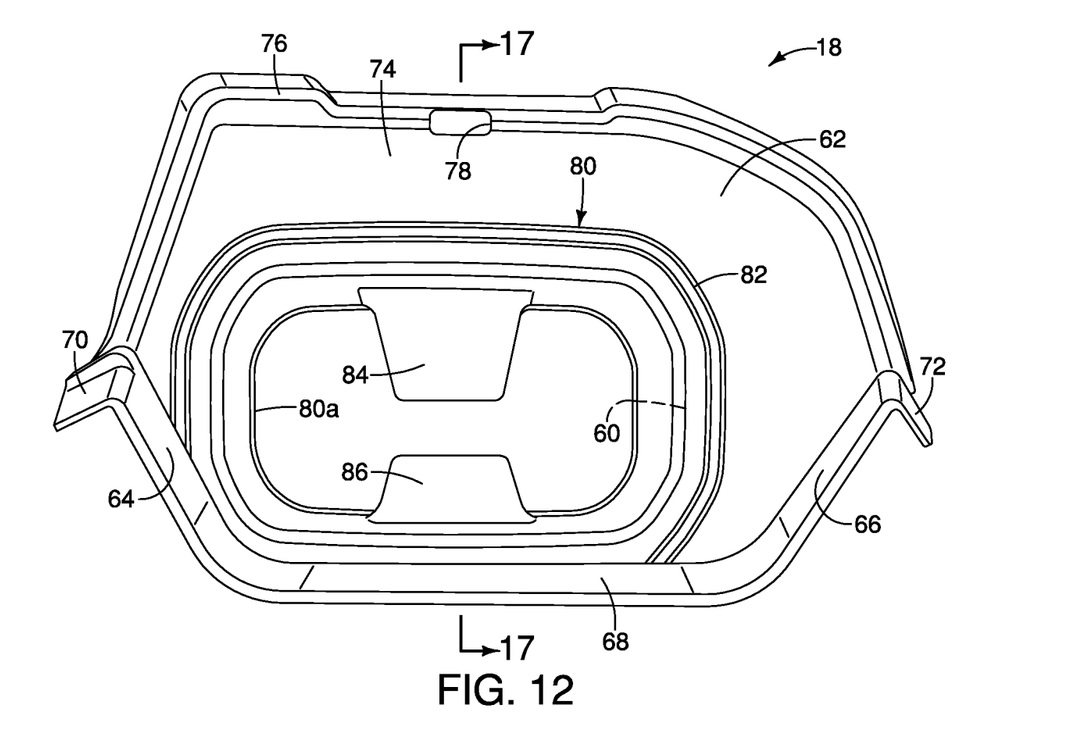
FIG. 12 is a rear view of the tow hook cover removed from the vehicle in accordance with the exemplary embodiment.
Figure 13:
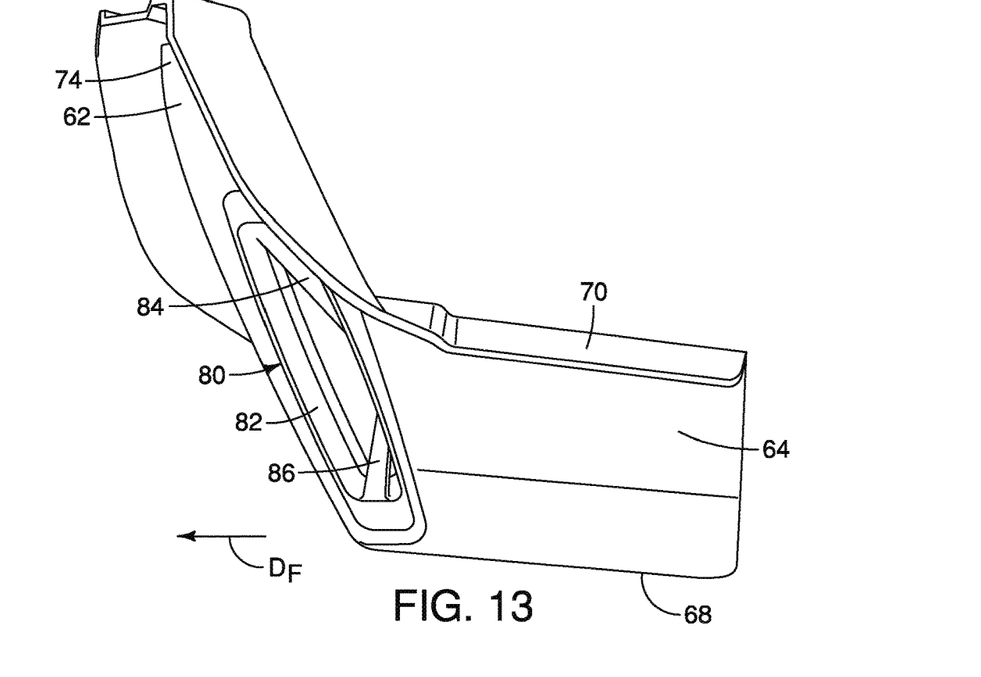
FIG. 13 is a side view of the tow hook cover removed from the vehicle in accordance with the exemplary embodiment.
Figure 14:
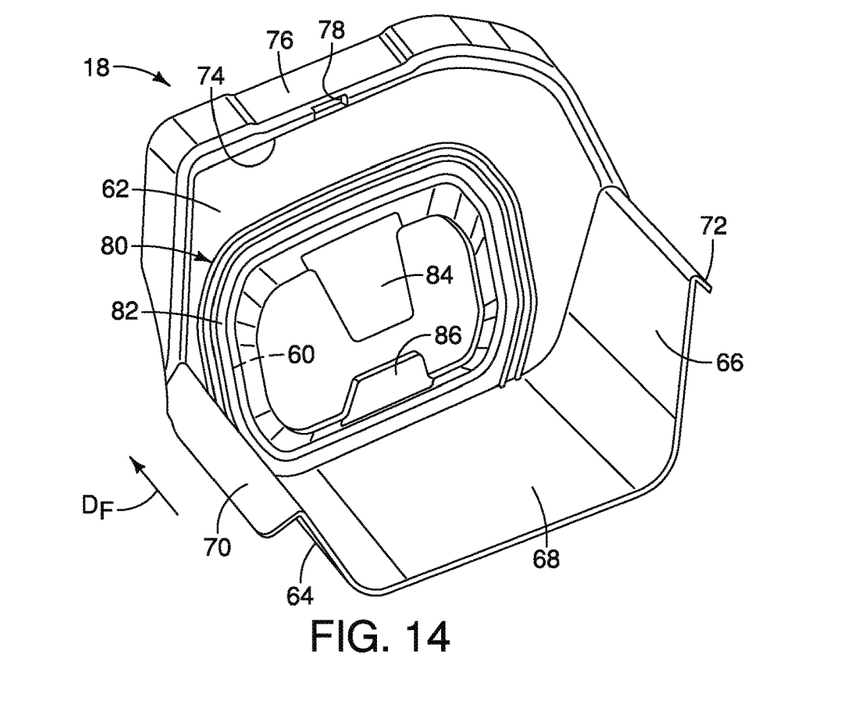
FIG. 14 is a rear perspective view of the tow hook cover removed from the vehicle in accordance with the exemplary embodiment.

The tow hook cover 18 also includes a flexible member 80 located that is substantially within the opening 60 of the upright wall portion 62. The opening 60 is also referred to as a first opening 60. The flexible member 80 defines a second opening 80a, as shown in FIGS. 10-12. The flexible member 80 also includes an attachment portion 82 that covers an inner edge of the opening 60 of the upright wall portion 62. As shown in FIGS. 2, 5-7 and 10-15, the flexible member 80 also includes a first flap 84 that extends downward from an upper section of the attachment portion 82 into the second opening 80a such that the first flap 84 extends into the opening 13c in the hook end 14a of the tow hook 14. The flexible member 80 further includes a second flap 86 that extends upward from a lower section of the attachment portion 82 into the second opening 80a such that the second flap 86 extends upward into the opening 14c in the hook end 14a of the tow hook 14.

The tow hook cover 18 can be made of any of a variety of materials, such as metal, plastic, resin based polymers, or other suitable materials. In the depicted embodiment, the tow hook cover 18 is a molded member, with the upright wall portion 62, first side wall 64, the second side wall 66 and the bottom wall 68 all being molded as a single, unitary, monolithic element, Thereafter, the flexible member 80 is molded such that the attachment portion 82 of the flexible member 80 surrounds and covers all edges that define the opening 60 of the upright wall portion 62. Further, the attachment portion 82, the first flap 84 and the second flap 86 of the flexible member 80 are all molded simultaneously as a single, unitary, monolithic element. The flexible member 80 is preferably made of a flexible rubber-like material that has sufficient flexibility such that the first and second flaps 84 and 86 can be bent and moved out of the opening 14c of the tow hook 14, but with sufficient resiliency such that the first and second flaps 84 and 86 remain in position extending into the opening 14c of the tow hook 14 in the absence of sufficient force.

The tow hook cover 18 is removably attached to the upper fascia member 20 via the snap-fitting projection 42. Further, since the first and second flaps 84 and 86 of the flexible member 80 of the tow hook cover 18 extend into the opening 14c of the tow hook 14, they too assist in retaining the tow hook cover 18 in place, once installed to the front bumper fascia assembly 16. Further, a mastic, adhesive or double sided tape can be positioned between the first flange 32 and the hook shaped edge 70, and, between the second flange 34 and the hook shaped edge 72. The tow hook cover 18 is removably attached to the upper fascia member 20. At least a portion of the hook end 14a of the tow hook 14 extends through the opening 60 of the tow hook cover 18 such that the attachment end 14b of the tow hook 14 is at least partially concealed by the tow hook covers 18.

The tow hook covers 18 can be removed, if desired, when using the tow hooks 14 with a heavy duty or large chain (not shown). However, it is not necessary to remove one or more of the tow hook covers 18 when using the tow hook 14 or hooks 14 when dragging or towing a heavy object.

The various vehicle body structures, other than the tow hook covers and front bumper assembly, are conventional components that are well known in the art. Since such vehicle body structural elements are well known in the art, these structures will not be discussed or illustrated in detail herein. Rather, it will be apparent to those skilled in the art from this disclosure that the components can be any type of structure that can be used to carry out the present invention.

General Interpretation Of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion." "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the tow hook cover of the vehicle body structure. Accordingly, these terms, as utilized to describe the present invention should be interpreted relative to a vehicle equipped with the tow hook cover of the vehicle body structure.

The term "configured" as used herein to describe a component, section or part of a device includes structure that is constructed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle body structure, comprising:
   a front side member;
   a tow hook having an attachment end and a hook end, the attachment end being fixedly attached to the front side member and the attachment end extending away from the hook end;
   a bumper assembly connected to the front side member and having at least one fascia panel; and
   a tow hook cover removably attached to the at least one fascia panel, the tow hook cover having an upright wall portion and a flexible member, the upright wall portion defining a first opening with the flexible member removably installed within the first opening, the flexible member defining a second opening with at least a portion of the hook end of the tow hook extending through the second opening such that the attachment end of the tow hook is at least partially concealed by the upright wall portion and the flexible member of the tow hook cover.

2. The vehicle body structure according to claim 1, wherein
   the tow hook cover includes a first side wall and a second side wall that extend from opposite sides of the upright wall portion.

3. The vehicle body structure according to claim 2, wherein
   at least one of the first side wall and the second side wall includes an upper edge with a hook shaped edge dimensioned and shaped to contact the at least one fascia panel such that the at least one first side wall and the second side wall is supported by the at least one fascia panel.

4. The vehicle body structure according to claim 3, wherein
   an upper end of the upright wall portion includes a flange dimensioned and shaped to overlay a portion of the at least one fascia panel.

5. The vehicle body structure according to claim 4, wherein
   the at least one fascia panel includes a snap-fitting projection, and
   the upper end of the upright wall portion includes a slot dimensioned to receive and retain the snap-fitting projection with the tow hook cover installed to the at least one fascia panel.

6. The vehicle body structure according to claim 2, wherein
   the at least one fascia panel includes a recessed area having a first flange and a second flange dimensioned and positioned such that the first side wall of the tow hook cover hangs from the first flange and the second side wall of the tow hook cover hangs from the second flange.

7. The vehicle body structure according to claim 1, wherein
   the flexible member is located substantially within the first opening of the upright wall.

8. The vehicle body structure according to claim 7, wherein
   the flexible member includes an attachment portion that covers an inner edge of the first opening of the upright wall and includes a first flap that extends downward from an upper section of the attachment portion such that the first flap extends into an opening in the hook end of the tow hook.

9. The vehicle body structure according to claim 8, wherein
   the flexible member further includes a second flap that extends upward from a lower section of the attachment portion such that the second flap extends into the opening in the hook end of the tow hook.

10. The vehicle body structure according to claim 1, wherein
    an upper end of the upright wall portion includes a flange dimensioned and shaped to overlay a portion of the at least one fascia panel.

11. The vehicle body structure according to claim 10, wherein
    the at least one fascia panel includes a snap-fitting projection, and
    the upper end of the upright wall portion includes a slot dimensioned to receive and retain the snap-fitting projection with the tow hook cover installed to the at least one fascia panel.

12. The vehicle body structure according to claim 11, wherein
    the flexible member includes an attachment portion that covers an inner edge of the opening of the upright wall and includes a first flap that extends downward from an upper section of the attachment portion such that the first flap extends into an opening in the hook end of the tow hook.

13. The vehicle body structure according to claim 12, wherein
    the flexible member further includes a second flap that extends upward from a lower section of the attachment portion such that the second flap extends into the opening in the hook end of the tow hook.

14. The vehicle body structure according to claim 1, wherein
    the at least one fascia panel is an upper fascia panel of the bumper assembly having a recessed area defined between first and second flanges of the upper fascia panel, and
    the bumper assembly includes a lower fascia panel having a recessed area defined between first and second edges of the lower fascia panel, with the tow hook cover being installed within the recessed area of the upper fascia panel and the recessed area of the lower fascia panel.

* * * * *